United States Patent
Krauss

(10) Patent No.: US 10,440,978 B2
(45) Date of Patent: Oct. 15, 2019

(54) METHOD FOR DECONTAMINATING BULK FOOD AND/OR FEED MATERIAL

(71) Applicant: Kreyenborg GmbH & Co. KG, Senden (DE)

(72) Inventor: Siegfried Krauss, Meiningen (DE)

(73) Assignee: Kreyenborg GmbH & Co. KG, Senden (DE)

( * ) Notice: Subject to any disclaimer, the term of this patent is extended or adjusted under 35 U.S.C. 154(b) by 48 days.

(21) Appl. No.: 15/033,784

(22) PCT Filed: Sep. 19, 2014

(86) PCT No.: PCT/DE2014/200491
§ 371 (c)(1),
(2) Date: May 2, 2016

(87) PCT Pub. No.: WO2015/067255
PCT Pub. Date: May 14, 2015

(65) Prior Publication Data
US 2016/0255871 A1  Sep. 8, 2016

(30) Foreign Application Priority Data

Nov. 8, 2013 (DE) ........................ 10 2013 222 762
Nov. 22, 2013 (DE) ........................ 10 2013 223 929

(51) Int. Cl.
*A23L 3/005* (2006.01)
*F26B 3/30* (2006.01)
(Continued)

(52) U.S. Cl.
CPC ............. *A23L 3/0055* (2013.01); *A23L 3/001* (2013.01); *A23L 3/165* (2013.01); *A23L 5/36* (2016.08);
(Continued)

(58) Field of Classification Search
CPC ........ A23L 3/0055; A23L 3/001; A23L 3/165; A23L 5/36; A23L 3/28; A23L 3/01; A23V 2002/00; F26B 11/04
See application file for complete search history.

(56) References Cited

U.S. PATENT DOCUMENTS 4,977,839 A * 12/1990 Fochtman ............. B09B 3/0091
110/226
2004/0062832 A1* 4/2004 Kemp .................... A23K 10/26
426/2

FOREIGN PATENT DOCUMENTS

CN 101785514 * 4/2010
DE 3446424 A1 6/1986
(Continued)

OTHER PUBLICATIONS

Machine translation of Eguchi JP 2001086932.*
(Continued)

*Primary Examiner* — Erik Kashnikow
*Assistant Examiner* — Lela S. Williams
(74) *Attorney, Agent, or Firm* — Alston & Bird LLP

(57) ABSTRACT

Method for decontaminating bulk food and/or feed material, in particular raw food and/or feed materials, comprising the following method steps: —inserting the bulk material into a rotary tube dryer, —increasing the temperature of the bulk material by means of at least one infrared radiator up to a defined treatment temperature range while at the same time rotating the bulk material, —maintaining the temperature of the bulk material in the treatment temperature range during a treatment phase by means of the infrared radiator while at the same time rotating the bulk material, —reducing the temperature of the bulk material to a discharge temperature while at the same time rotating the bulk material, —discharging the bulk material from the rotary tube dryer.

13 Claims, 2 Drawing Sheets

Figure 2:
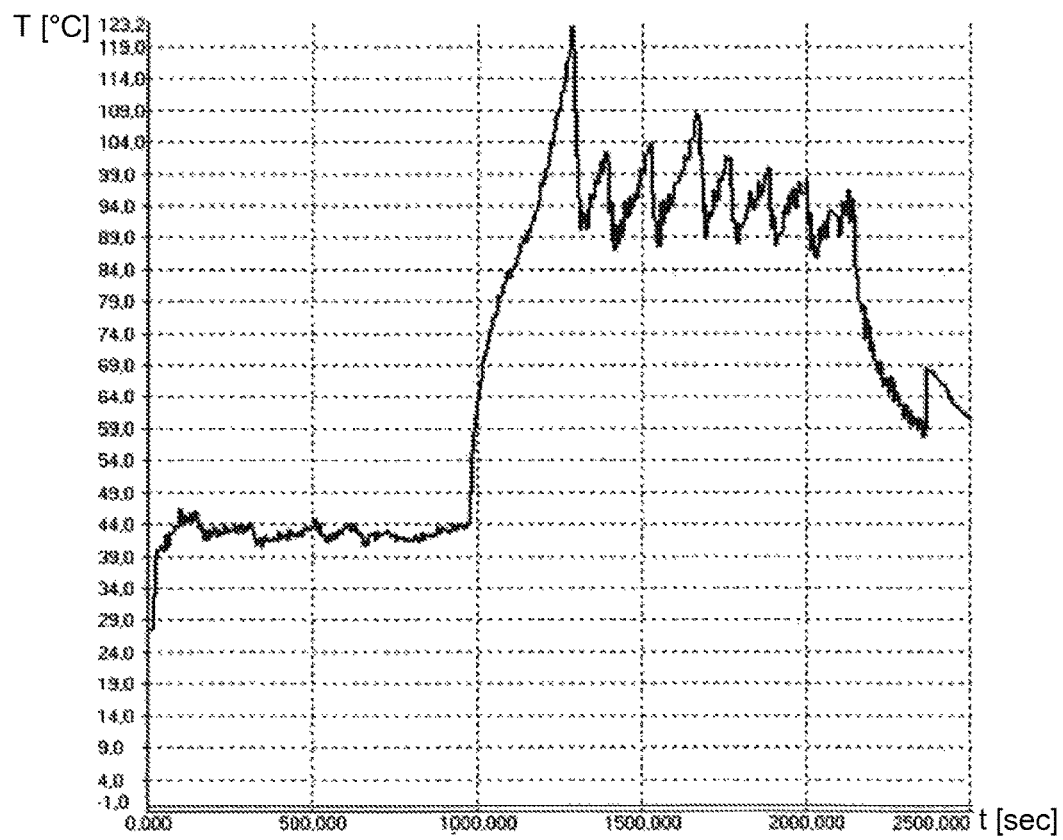

(51) Int. Cl.
*F26B 11/04* (2006.01)
*A23L 3/00* (2006.01)
*A23L 3/16* (2006.01)
*A23L 5/30* (2016.01)

(52) U.S. Cl.
CPC .............. *F26B 3/30* (2013.01); *F26B 11/04* (2013.01); *A23V 2002/00* (2013.01)

(56) References Cited

FOREIGN PATENT DOCUMENTS

| | | | |
|---|---|---|---|
| JP | 2001086932 A | 4/2001 | |
| JP | 2002059131 A | 2/2002 | |
| JP | 2011250725 A | 12/2011 | |
| KR | 20090097546 A | 9/2009 | |
| WO | WO 1997/033469 A1 | 9/1997 | |

OTHER PUBLICATIONS

European Patent Office, Communication pursuant to 94 (3) EPC for Application No. 14793774.2, dated Mar. 27, 2017, 4 pages, Netherlands.
English language machine translation of previously recorded foreign reference JP 2001086932 A to Enguchi.
English language machine translation of previously recorded foreign reference JP 2011250725 A to Chieko.
English language machine translation of previously recorded foreign reference KR 20090097546 A to Lee.
English language machine translation of previously recorded foreign reference JP 2002059131 A to Someya.
International Searching Authority, International Search Report (ISR) and Written Opinion for International Application No. PCT/DE2014/200491, dated Feb. 5, 2015, 13 pages, European Patent Office, The Netherlands.
The International Bureau of WIPO, International Preliminary Report on Patentability (English translation of ISA's Written Opinion) for International Application No. PCT/DE2014/200491, dated May 10, 2016, 7 pages, Switzerland.

* cited by examiner

| Startzeit | 16.36 | Uhr | | Menge Charge | | 1 | kg | | |
|---|---|---|---|---|---|---|---|---|---|
| | | | | | | | | | |
| Zeit | Zeit | Tromm | Strahler | | Temp. | RF | SG | Bemerkung | |
| min | sek | % | Anz. | % | °C | % | g/l | | |
| | | | | | | | | | |
| 0 | 0 | 20 | 3 | 30 | 37 | 4,75 | 110 | 30 sek Wasser | 180ml |
| 1 | 60 | | 2 | 35 | 43 | | | | |
| 2 | 120 | | | | 45 | | | 20 sek Wasser | 120ml |
| 3 | 180 | | | | 41 | | | | |
| 4 | 240 | | | | 43 | | | | |
| 5 | 300 | | | | 45 | | | 20 sek Wasser wegen Agglomeratbildung | |
| 6 | 360 | | | | 40 | | | | 120ml |
| 7 | 420 | | 2 | 45 | 42 | | | | |
| 8 | 480 | | | | 44 | | | 30 sek Wasser, Produkt fließt schlechter | |
| 9 | 540 | | | | 41 | | | | |
| 10 | 600 | | | | 45 | | | 30 sek Wasser | |
| 11 | | | | | 40 | 37,76 | | | |
| 12 | | | 2 | 35 | 42 | | | | |
| 13 | | | 2 | 45 | 41 | | | | |
| 14 | | | | | 42 | | | | |
| 15 | | | 5 | 100 | 43 | | | | |
| 16 | | | | | 70 | | | | |
| 17 | | | | | 80 | | | | |
| 18 | | | | | 85 | | | Kurve steigt deutlich langsamer | |
| 19 | | | | | 90 | | | | |
| 20 | | | | | 100 | | | | |
| 21 | 20 H2O | | 3 | 100 | 110 | 6,76 | | | |
| 22 | | | | | 90 | | | | |
| 23 | 20 H2O | | | | 100 | | | | |
| 24 | | riecht leicht | | | 90 | | | | |
| 25 | 20 H2O | | | | 100 | | | | |
| 26 | | | | | 90 | | | | |
| 27 | | | | | 100 | | | | |
| 28 | 20 H2O | | | | 108 | | | | |
| 29 | 20 H2O | | 3 | 90 | 100 | | | | |
| 30 | | riecht wenig | | | 90 | | | | |
| 31 | 20 H2O | | | | 100 | | | | |
| 32 | | | | | 90 | | | | |
| 33 | 20 H2O | | | | 100 | | | | |
| 34 | | | 3 | 80 | 90 | | | | |
| 35 | Strahler aus | | | | 95 | | | | |
| 37 | entleeren | | IRE72 | | 60 | 8,40 | | | |

Fig. 1

METHOD FOR DECONTAMINATING BULK FOOD AND/OR FEED MATERIAL

CROSS REFERENCE TO RELATED APPLICATIONS

This application is a National Stage Application, filed under 35 U.S.C. § 371, of International Application No. PCT/DE2014/200491, filed Sep. 19, 2014, which claims priority to German Application No. 10 2013 223 929.7, filed Nov. 22, 2013, and German Application No. 10 2013 222 762.0, filed Nov. 8, 2013, the contents of all of which are hereby incorporated by reference in their entirety.

BACKGROUND

The invention concerns a method for decontaminating bulk food products and/or bulk animal feed products, in particular the raw materials for these food or animal feed products.

The contamination of food or animal feed products may be caused by various factors. Among other things, for example, the selective use of pesticides, fungicides or storage protection agents is possible. Food products and animal feed products may also be contaminated by tainted soils, molds or pest infestation.

Because of the growing world population, environmental pollution, and thus the contamination of food and animal feed products, continues to increase. For this reason legislators, manufacturers and consumers have been greatly sensitized over the last few years to the problem of contaminated food. Contamination-free cultivated areas worldwide are decreasing rapidly in spite of biocertification, and the expectations in terms of quality, price, quantity and standardized appearance of food and/or animal feed products demanded by the industry and the consumers force the producers to use more and more chemicals.

This problem is made notably worse by the global procurement and sales markets with all their differing mentalities, traditions, standards and laws. Furthermore, the means for analyzing food and/or animal feed products continue to improve, inducing legislators to gradually reduce the threshold values that these goods may not exceed. There is thus a great need for the treatment of products contaminated with bacteria, toxins, pesticides or other harmful substances exceeding the permitted thresholds so that they do not have to be discarded.

No method for decontaminating food and/or animal feed products, reducing the contaminants to the point where such food or animal feed products can be used, is known at this time. Therefore entire batches of food and/or animal feed products are disposed of if random samples exceed the permitted thresholds.

The problem that the present invention is meant to solve is therefore to design a method for decontaminating bulk food and/or bulk animal feed products of the type mentioned above in such a way that the contamination is reduced using simple tools, that the food and animal feed products do not exceed the indicated thresholds and that they thus can be processed for further productive use.

BRIEF SUMMARY

According to the invention, the preceding problem is solved by the features of claim 1. Accordingly, the method under consideration has the following method steps:

Pouring the bulk material into a rotary drier,

Increasing the temperature of the bulk material by means of at least one infrared emitter up to a predefined treatment temperature range while simultaneously rotating the bulk material, Maintaining the temperature of the bulk material in the treatment temperature range by means of the infrared emitter during a treatment phase while simultaneously rotating the bulk material, Decreasing the temperature of the bulk material to an exit temperature while simultaneously rotating the bulk material, Discharging the bulk material from the rotary drier.

First of all it should be noted that, for the sake of simplicity, the above refers to bulk materials, meaning food products and/or animal feed products shipped in bulk.

The first insight according to the invention was gained by realizing that the underlying problem can be solved in an astonishingly simple way by the skillful treatment of the bulk food and/or bulk animal feed products in a rotary drier. For this purpose the bulk material is poured into the rotary drier and heated to a predefined treatment temperature range by means of infrared radiation. During this process the bulk material is rotated. The rotation of the bulk material ensures that each individual particle is heated evenly by the infrared radiation. Infrared radiation has the advantage that the bulk material is heated up from the inside out and that the vaporizing moisture is drawn outward. It is therefore possible to vaporize the contaminants using relatively little energy while treating the food and/or animal feed products very gently. What is more, the infrared radiation kills off bacteria, yeasts and molds.

When the treatment temperature range is reached, the temperature of the bulk material is held at that level by means of the infrared radiation while the bulk material continues to rotate. During this process the infrared radiation vaporizes contaminants such as pesticides and other harmful substances out of the bulk material and reduces the contaminating bacteria, yeasts and molds.

The temperature of the bulk material is then reduced to an exit temperature while the bulk material continues to rotate. Finally the decontaminated bulk material is discharged from the rotary drier. The treatment temperature range, the duration of the treatment phase and the other indicated parameters can be set depending on the food and/or animal feed product to be decontaminated and on the existing contaminants.

It should be noted that the concept of decontamination is taken here in its broadest sense as it covers the reduction of the contamination in bulk food and/or bulk animal feed products with microbiological impurities and/or bacterial loads and/or yeasts, molds or parasites and/or their excretions and/or mycotoxins and/or residuals of pesticides and/or any other substances harmful to humans and/or to animals.

These bulk food and/or bulk animal feed products might be spices—e.g. pepper—and/or tea and/or coffee and/or herbs and/or fungi and/or vegetables—e.g. chives. They might be present in powder form or small particles with diameters ranging e.g. from 500 µm to 5 cm.

Preferably the infrared emitter emits near-infrared radiation with a wavelength ranging from 0.78 to 3.0 µm and/or mid-infrared radiation with a wavelength ranging from 3 to 50 µm. It is also conceivable to treat the bulk material with a plurality of infrared emitters emitting infrared radiation at different wavelengths.

Preferably the bulk material is treated also using at least one ultraviolet emitter. This makes it possible, on the one hand, to vaporize other contaminants and, on the other hand, to destroy any bacteria, spores, yeasts, molds or parasites.

In a particularly advanced method, the temperature of the bulk material during an excitation phase may be maintained within an excitation temperature range, thereby exciting the spores of spore-producing bacteria to germinate. Bacteria are much easier to kill than spores. The germinated spores can be therefore destroyed simply and safely in one of the subsequent method steps.

Water may be injected into the rotary drier in order to increase the temperature of the bulk material more quickly. The water can thereby be injected e.g. as water aerosol or as saturated steam. It is also conceivable to heat the water beforehand, i.e. the water temperature is higher than the temperature of the bulk material. In this process it is particularly advantageous if the water, water aerosol or saturated steam is injected via a steam-carrying injection device installed in the light cone of the infrared and/or ultraviolet emitter and/or via a water-spraying device installed in the light cone of the infrared or ultraviolet emitter. This has the same effect as a steam drier or an after-heater.

It is also advantageous to after-dry the bulk material to achieve a predefined residual moisture level by means of the infrared and/or the ultraviolet emitter. The after-drying process can thereby take place before, during or after the material is cooled to the exit temperature. Therefore the bulk material is decontaminated in one processing step and dried for safe storage. This creates a raw material concentrate that can be safely stored without the use of preservatives, refrigeration technology, thermal energy or special packaging and can be transported without a problem.

The bulk material may also be vacuum-treated before, during or after being cooled. This method step ensures a further germ-killing and/or parasite-killing treatment, and also optimally prepares the bulk material for storage.

In order to make the vaporization of the contaminants as gentle as possible, the temperature of the bulk material may be increased temporarily during the treatment phase to beyond the treatment temperature range. This temporary rise in temperature of the bulk material may also be repeated several times to ensure that the temperature of the bulk material rises during the treatment phase several times to beyond the treatment temperature range.

In order to treat the bulk material gently, the temperature of the bulk material may be reduced during the treatment phase to below the treatment temperature range. Preferably the temperature of the bulk material is reduced at intervals during the treatment phase repeatedly to below the treatment temperature range. This ensures a gentle decontamination in particular in connection with sensitive foods such as e.g. chives.

It is also possible to increase and to reduce the temperature of the bulk material during the treatment phase in alternation and temporarily to beyond the treatment temperature range and then to below the treatment temperature range, or to reduce it first and increase it afterwards.

These changes in the temperature of the bulk material may also be implemented several times consecutively. In this way the contaminants are vaporized out of the bulk material while the bulk material itself is treated very gently.

In a particularly advanced method the temperature of the bulk material may be affected by a change in the intensity of the infrared and/or ultraviolet emitter and/or by injecting water. Preferably water aerosol or saturated steam is injected for this purpose.

Depending on the type of food and/or animal feed product, it may be advantageous to humidify it before it enters into the rotary drier and/or during the decontamination in the rotary drier. This prevents excessive heat and the associated destruction of the food and/or animal feed bulk material.

In another advantageous method the—preferably dried—bulk material is humidified in the rotary drier. This opens up the cell structure of the bulk material, thereby releasing aromas.

Also, liquid additives may be applied to the bulk material during decontamination, drying them thereby directly into the cell structure of the bulk material. Preferably the liquid additives are applied to the bulk material before and/or during the treatment phase.

In order to accelerate the decontamination, the bulk material may be heated at the beginning of the process for a short period to beyond the treatment temperature range (the so-called “heat peak”). This reduces the decontamination period. A shorter decontamination period has proven particularly advantageous for the quality of the treated bulk material.

BRIEF DESCRIPTION OF THE FIGURES

There are various options for developing and implementing the teaching of the present invention in an advantageous manner. For this purpose, reference is made first to the claims subordinate to claim 1, and secondly, to the following description of a preferred embodiment of the invention using the drawings. In the context of the explanation of the preferred embodiment of the invention using the drawings, other generally preferred embodiments and implementations of the teaching are explained as well. The drawings show:

FIG. 1 a process protocol of the decontamination of chives as a bulk food product and FIG. 2 the temperature gradient of the bulk material when decontaminating the bulk material according to FIG. 1.

DETAILED DESCRIPTION OF VARIOUS EMBODIMENTS

FIG. 1 shows the decontamination of chives, present as a bulk material in dried form with a diameter ranging from 1 to 2.5 mm.

As the protocol in FIG. 1 shows, the bulk material is heated in the rotary drier to the desirable treatment temperature range at an infrared radiation intensity specified beforehand. In this exemplary embodiment the treatment temperature ranges between approx. 93° C. and 96° C. In order to protect the bulk material and to increase of the temperature of the bulk material more quickly, water is sprayed on the bulk material while it is heated.

In order to excite spores of spore-forming germs to germinate, the temperature of the bulk material is held at an excitation temperature range during an excitation phase before the treatment temperature range is reached. In this way the spores germinate and can therefore be killed off more easily.

After approximately 1,300 seconds the bulk material temperature reaches the treatment temperature range. During the treatment phase the contaminants and harmful substances are vaporized out of the bulk material, thereby decontaminating it.

In the example represented here the temperature of the bulk material is increased temporarily to beyond the treatment temperature range to approx. 125° C. (the so-called "heat peak"). This rapid heating reduces the decontamination period, which has a particularly gentle effect on the product.

Subsequently the temperature of the bulk material during the treatment phase is maintained within the treatment temperature range, whereby the temperature of the bulk material is increased repeatedly for short periods to beyond the treatment temperature range. This increases the vaporization of harmful substances out of the bulk material, whereby the chives, which are particularly sensitive, are protected optimally from excessive temperatures.

After approximately 2,100 seconds the bulk material is cooled down to the exit temperature of approx. 50° C. Finally, the cooled and decontaminated bulk material is taken out of the rotary drier.

FIG. 2 shows the temperature of the bulk material when decontaminating chives according to FIG. 1 as a function of time. FIG. 2 shows clearly the increase in temperature of the bulk material to beyond the treatment temperature range—the heat peak. The treatment phase begins at approx. 1,300 seconds and ends at approx. 2,100 seconds. During the treatment phase the temperature of the bulk material is maintained within the treatment temperature range and increased repeatedly for short periods to beyond the treatment temperature range. In order to avoid repetitions, reference is made here to the explanations under FIG. 1.

The first insight according to the invention was gained by realizing that the underlying problem can be solved in an astonishingly simple way by the skillful treatment of the bulk food and/or bulk animal feed products in a rotary drier. For this purpose the bulk material is poured into the rotary drier and heated to a predefined treatment temperature range by means of infrared radiation. During this process the bulk material is rotated. The rotation of the bulk material ensures that each individual particle is heated evenly by the infrared radiation. Infrared radiation has the advantage that the bulk material is heated up from the inside out and that the vaporizing moisture is drawn outward. It is therefore possible to vaporize the contaminants using relatively little energy while treating the food and/or animal feed products very gently. What is more, the infrared radiation kills off bacteria, yeasts and molds.

When the treatment temperature range is reached, the temperature of the bulk material is held at that level by means of the infrared radiation while the bulk material continues to rotate. During this process the infrared radiation vaporizes contaminants such as pesticides and other harmful substances out of the bulk material and reduces the contaminating bacteria, yeasts and molds.

The temperature of the bulk material is then reduced to an exit temperature while the bulk material continues to rotate. Finally the decontaminated bulk material is discharged from the rotary drier. The treatment temperature range, the duration of the treatment phase and the other indicated parameters can be set depending on the food and/or animal feed product to be decontaminated and on the existing contaminants.

It should be noted that the concept of decontamination is taken here in its broadest sense as it covers the reduction of the contamination in bulk food and/or bulk animal feed products with microbiological impurities and/or bacterial loads and/or yeasts, molds or parasites and/or their excretions and/or mycotoxins and/or residuals of pesticides and/or any other substances harmful to humans and/or to animals.

These bulk food and/or bulk animal feed products might be spices—e.g. pepper—and/or tea and/or coffee and/or herbs and/or fungi and/or vegetables—e.g. chives. They might be present in powder form or small particles with diameters ranging e.g. from 500 µm to 5 cm.

Preferably the infrared emitter emits near-infrared radiation with a wavelength ranging from 0.78 to 3.0 µm and/or mid-infrared radiation with a wavelength ranging from 3 to 50 µm. It is also conceivable to treat the bulk material with a plurality of infrared emitters emitting infrared radiation at different wavelengths.

Preferably the bulk material is treated also using at least one ultraviolet emitter. This makes it possible, on the one hand, to vaporize other contaminants and, on the other hand, to destroy any bacteria, spores, yeasts, molds or parasites.

In a particularly advanced method, the temperature of the bulk material during an excitation phase may be maintained within an excitation temperature range, thereby exciting the spores of spore-producing bacteria to germinate. Bacteria are much easier to kill than spores. The germinated spores can be therefore destroyed simply and safely in one of the subsequent method steps.

Water may be injected into the rotary drier in order to increase the temperature of the bulk material more quickly. The water can thereby be injected e.g. as water aerosol or as saturated steam. It is also conceivable to heat the water beforehand, i.e. the water temperature is higher than the temperature of the bulk material. In this process it is particularly advantageous if the water, water aerosol or saturated steam is injected via a steam-carrying injection device installed in the light cone of the infrared and/or ultraviolet emitter and/or via a water-spraying device installed in the light cone of the infrared or ultraviolet emitter. This has the same effect as a steam drier or an after-heater.

It is also advantageous to after-dry the bulk material to achieve a predefined residual moisture level by means of the infrared and/or the ultraviolet emitter. The after-drying process can thereby take place before, during or after the material is cooled to the exit temperature. Therefore the bulk material is decontaminated in one processing step and dried for safe storage. This creates a raw material concentrate that can be safely stored without the use of preservatives, refrigeration technology, thermal energy or special packaging and can be transported without a problem.

The bulk material may also be vacuum-treated before, during or after being cooled. This method step ensures a further germ-killing and/or parasite-killing treatment, and also optimally prepares the bulk material for storage.

In order to make the vaporization of the contaminants as gentle as possible, the temperature of the bulk material may be increased temporarily during the treatment phase to beyond the treatment temperature range. This temporary rise in temperature of the bulk material may also be repeated several times to ensure that the temperature of the bulk material rises during the treatment phase several times to beyond the treatment temperature range.

In order to treat the bulk material gently, the temperature of the bulk material may be reduced during the treatment phase to below the treatment temperature range. Preferably the temperature of the bulk material is reduced at intervals during the treatment phase repeatedly to below the treatment temperature range. This ensures a gentle decontamination in particular in connection with sensitive foods such as e.g. chives.

It is also possible to increase and to reduce the temperature of the bulk material during the treatment phase in alternation and temporarily to beyond the treatment temperature range and then to below the treatment temperature range, or to reduce it first and increase it afterwards.

These changes in the temperature of the bulk material may also be implemented several times consecutively. In this way the contaminants are vaporized out of the bulk material while the bulk material itself is treated very gently.

In a particularly advanced method the temperature of the bulk material may be affected by a change in the intensity of the infrared and/or ultraviolet emitter and/or by injecting water. Preferably water aerosol or saturated steam is injected for this purpose.

Depending on the type of food and/or animal feed product, it may be advantageous to humidify it before it enters into the rotary drier and/or during the decontamination in the rotary drier. This prevents excessive heat and the associated destruction of the food and/or animal feed bulk material.

In another advantageous method the—preferably dried—bulk material is humidified in the rotary drier. This opens up the cell structure of the bulk material, thereby releasing aromas.

Also, liquid additives may be applied to the bulk material during decontamination, drying them thereby directly into the cell structure of the bulk material. Preferably the liquid additives are applied to the bulk material before and/or during the treatment phase.

In order to accelerate the decontamination, the bulk material may be heated at the beginning of the process for a short period to beyond the treatment temperature range (the so-called "heat peak"). This reduces the decontamination period. A shorter decontamination period has proven particularly advantageous for the quality of the treated bulk material.

Finally, explicit reference is made to the fact that the exemplary embodiments of the device according to the invention described above are used only for explanation of the claimed teaching, but the teaching is not restricted to the exemplary embodiments.

The invention claimed is:

1. Method for decontaminating bulk food, said method comprising the following steps:

pouring the bulk material into a rotary drier, increasing the temperature of the bulk material up to a predefined treatment temperature range while simultaneously rotating the bulk material, maintaining the temperature of the bulk material in the treatment temperature range during a treatment phase while simultaneously rotating the bulk material, decreasing the temperature of the bulk material to an exit temperature while simultaneously rotating the bulk material, and discharging the bulk material from the rotary drier, wherein:

the increasing and maintaining of the temperature steps each involve a combination of simultaneously: (a) injecting water, water aerosol, or saturated steam within a light cone of at least one infrared emitter, and (b) adjusting an intensity of at least one infrared emitter; and the water, water aerosol, or saturated steam is injected via at least one of (a) a steam-carrying injection device installed within the light cone of the at least one infrared emitter, or (b) a water-spraying device installed in the light cone of the at least one infrared emitter.

2. Method according to claim 1, wherein the bulk material is also treated via at least one ultraviolet emitter.

3. Method according to claim 2, wherein the water is further injected via an injection device or a water-device installed in the light cone of the at least one ultraviolet emitter.

4. Method according to claim 2, wherein the temperature of the bulk material is further affected by changing the intensity of the at least one ultraviolet emitter.

5. Method according to claim 1, wherein the bulk material temperature is maintained during an excitation phase in an excitation temperature range in order to excite the spores of spore-forming germs to germinate.

6. Method according to claim 1, wherein the bulk material is vacuum-treated at least one of before, during, or after cooling the bulk material.

7. Method according to claim 1, wherein the bulk material is humidified before being poured into the rotary drier.

8. Method according to claim 1, wherein the bulk material is humidified in the rotary drier to open up its cell structure, thereby releasing the aroma.

9. Method according to claim 1, wherein dried bulk material is humidified in the rotary drier to open up its cell structure, thereby releasing the aroma.

10. Method according to claim 1, wherein liquid additives are applied to the bulk material during the treatment process in the rotary drier, drying them thereby directly into the cell structure of the bulk material.

11. Method according to claim 1, wherein liquid additives are applied to the bulk material at least one of before or during the treatment phase, drying them thereby directly into the cell structure of the bulk material.

12. Method according to claim 1, wherein the bulk food comprises animal feed products.

13. Method according to claim 1, wherein the bulk food comprises raw materials for at least one of food or animal feed products.

* * * * *